United States Patent [19]
Doyama

[11] Patent Number: 5,621,289
[45] Date of Patent: Apr. 15, 1997

[54] SYSTEM FOR DETECTING MALFUNCTION BY MONITORING TORQUE OF A TRANSFER DEVICE

[75] Inventor: Yoshihiro Doyama, Osaka, Japan

[73] Assignee: Kurimoto, Ltd., Osaka, Japan

[21] Appl. No.: 366,093

[22] Filed: Dec. 29, 1994

[30] Foreign Application Priority Data

Mar. 31, 1994 [JP] Japan ..................................... 6-87721

[51] Int. Cl.⁶ ..................................................... H02P 7/00
[52] U.S. Cl. ........................................... 318/432; 361/23
[58] Field of Search ................................... 318/638, 650, 318/432, 652, 434, 449, 450, 446–470; 388/930, 937; 81/389, 390, 419, 473, 57, 11; 361/23, 31

[56] References Cited

U.S. PATENT DOCUMENTS

| | | | |
|---|---|---|---|
| 3,887,855 | 6/1975 | Klimo | 318/434 X |
| 3,962,910 | 6/1976 | Spyridakis et al. | 73/88 F |
| 4,066,942 | 1/1978 | Bardwell et al. | 318/434 |
| 4,445,075 | 4/1984 | Fry | 318/434 |
| 4,918,744 | 4/1990 | Shimizu | 361/33 X |
| 4,959,797 | 9/1990 | McIntosh | 318/432 X |
| 5,014,793 | 5/1991 | Germantown et al. | 81/473 X |

Primary Examiner—Jonathan Wysocki
Attorney, Agent, or Firm—Jones, Tullar & Cooper, P.C.

[57] ABSTRACT

Safe operation of a transfer device on a press is provided by the present invention. In the transfer device in which the drive of servo motors in the drive units 1, is caused to be synchronized with the operation of the transfer press itself by positionally controlling motions of beams through servo controllers a torque value of a specific transfer pattern actually measured under normal operation is established to be a reference torque value of the transfer pattern; a torque allowance is calculated by defining the upper and lower limit torque values by adding or subtracting a preliminarily set deviation value to or from the reference torque value in a CPU of a control unit, and the torque allowance is stored in the control unit. The actual torque value is compared with the torque allowance to acknowledge whether or not the actual torque value is within the stored torque allowance in later forming operation using the same transfer pattern. As a result, malfunctions such as the drop out of any part, catching of any foreign matter, poor lubrication, idle running of the servo motors, all of which is impossible to prevent by mere conventional positional control of the beams, etc. are instantaneously detected.

3 Claims, 5 Drawing Sheets

SYSTEM FOR DETECTING MALFUNCTION BY MONITORING TORQUE OF A TRANSFER DEVICE

BACKGROUND OF THE INVENTION

1. Field of the Invention

The present invention relates to a malfunction detection system for securing the safe operation of a transfer device mounted on a transfer press.

2. Prior Arts

A transfer press is a type of forging press for efficiently handling with plural workpieces simultaneously, and in which two beam drivers are provided respectively on the left and right sides of the forging press. A three-directional motions, i.e., vertical motion (lift), advance and return (feed), and opening-and-closing motion (clamp) are combined and applied to two beams disposed for horizontally connecting horizontally the mentioned two beam drivers and placing them between upper and lower molds, whereby a workpiece clamped between clamping fingers attached inwardly to both beams are transferred to and placed at a required position.

The most important requirement for normally continuing the operation of such a transfer press is a perfect synchronization of actuation of the press with actuation of the transfer device which feeds a workpiece to each mold and, upon completing one forming step, moves therefrom to transfer the workpiece to the following mold. Without perfect synchronization, clamping fingers of the transfer device may be caught between a lowering press ram and the mold, thereby bringing about a serious problem relating to breakdown or damage. To overcome this problem, it has been conventionally employed that actuation of the transfer device is introduced from a drive mechanism of the transfer press itself, and synchronization is established through a transmission mechanism formed by combining mechanical elements such as a cam, a gear, a rack, etc. A lot of attempts to meet various kinds of problems occurring in the course of transmission have also heretofore proposed.

For example, Japanese Patent Publication (examined) No. Sho 55-32480 discloses a construction in which a pulse generator mounted on a main shaft of a press is combined with another pulse generator mounted on a rotary cam switch side coupled to the mentioned main shaft in such a manner as to generate pulses alternately, whereby an emergency stop is operated when no pulse is outputted from one pulse generator between pulses from the other pulse generator (i.e., when there is no alternative pulse generation). Japanese Patent Publication (unexamined) No. Sho 60-44137 discloses a construction in which a total value comprised of a value set by a feed setting digital switch and a predetermined value added thereto is compared with an actual value obtained from the rotational frequency of a motor in a comparator, and a stop signal is outputted when the actual value exceeds the mentioned total value. Japanese Patent Publication (unexamined) No. Hei 3-226325 discloses a construction in which a range finder for measuring a feed bar position at a specific stop point in a series of operations of the feed bar is disposed to monitor feed bar position. Japanese Utility Model Registration Publication (unexamined) No. Sho 61-63332 discloses a construction in the normal presence of a workpiece is preliminarily stored and is compared with the actually detected presence of the workpiece at every station.

In the mentioned conventional mechanisms, however, since the association or combination among cam disk, gear rack, etc. is fixed, stroke, timing and speed of the three-directional motion of the beams are feasible only under fixed values, and it is impossible to vary those factors depending upon size and type of workpiece, resulting in several practical use problems except in large size automatic forging presses in which workpiece variation is small.

That is, in most cases the operation of the transfer type of forging press popularly employed in the industry, workpieces to be forged are directed to the production of a wide variety but a small quantity. To meet such a practical need, it has been conventional to change the arrangment of molds or change the clamping fingers to be mounted on the beams, thereby performing a required variety of movements of the beams using the fixed transfer mechanism. Needless to say, such a conventional change of mold arrangement or clamping fingers results in considerable reduction in productivity of the entire forging press and, moreover, brings about rather troublesome maintenance. Furthermore, the mentioned combination is obliged to be mechanically complicated and results in a large-sized drive mechanism due to employment of a lot of stiff components and parts, occupying a large space on the left and right sides of the forging press.

In recent years, an idea has ben proposed and adopted for controlling the three-demensional motion of the feed bar by providing a servo motor as a drive mechanism independent of the drive mechanism of the press itself, whereby a technique has been developed, and in which various strokes and timing of operations are freely established by software in order to continue a complicated motion of the transfer mechanism. Thus it is said that most of the mentioned problems have been solved. In this recent technology, however, a direct association between operation of the press and that of the transfer device is not maintained and both of them are operated independently of each other. As a result, to achieve a perfect synchronization, more accurate control than those of the known arrangement is an essential requirement.

Japanese Patent Publication (unexamined) No. Sho 62-9731 proposes a technique for securing synchronization at the time of operating the transfer device through a servo mechanism independent of the driving of the press itself. According to this technique, a target position of a controlled member of the transfer press is decided according to an actual position of the press of the transfer press, and not only the controlled member is caused to follow the decided target position but also the actual position of the controlled member is compared with a critical allowance value decided according to the target position, whereby quick control is performed if the critical value is exceeded. Generally in known servo control, when any data indicating a target position of a motor is given, a control operation is basically performed in such a manner that data indicating an actual position of the motor fed back by encoder or the like follow the mentioned target position. On the other hand, in this known technique, a critical value of allowance is calculated and, when the actual position exceeds the allowed critical value or limit, any emergency means such as an alarm, stopper is operated.

FIG. 5(A) is a perspective view of this known arrangement showing the operation of a beam 4a operated by a servo motor 11a, and in which a rack 101 is mated with a pinion 102 and, accordingly, when driving the servo motor 11a connected to the pinion shaft, the beam 4a moves forward (advancing movement) or backward (returning movement). Since a position error is established to be within a predetermined allowance as shown in FIG. 5(B), and the allowable error is stored in a control unit, if occuring any positional error getting out of the predetermined allowance, an instruction signal is instantly outputted so as to give an alarm or instruct an emergency stop of the system operation, thereby the entire system is prevented from serious troble or accident.

However, what is recognized as a concept common to all of the mentioned known arrangements, including the mechanical synchronization system between the transfer press and the transfer device by mechanical association or combination of relative members and the electrical synchronization system utilizing a servo control, is directed just to an acknowledgment of the operational position of the transfer device relative to operational position of the transfer press. In other words, to a positional acknowledgement of a predetermined specific point of the beam and a malfunction detection thereof. It is sometimes a teaching in practical operation that mere detection of the mentioned two operational positions of a normal positional relation therebetween is not always sufficient control information to prevent all kinds of troubles, and that the timing of such detection itself is to late. Even when a specific position of a member of the transfer device such as a beam (feed bar) subject to a detection is detected to be under normal positional relation to the operational position of the press, it does not mean that all positions of peripheral members of the beam are covered by such detection. That is, members subject to the malfunction detection are quite limited. As a result, if any member not subject to detection should drop out or such member should get in the drive transmission system and is caught therein, serious trouble in the form of an accident can be caused thereby, which cannot be foreseen so long as there is no abnormality detection as to the position of the member subject to detection.

There may be a case in which, if any member of the transmission mechanism of the servo motor or driving unit should drop out, transmission of the following operation is suspended even when a member subject to detection is actually in a normal position and the servo motor is running at idle, thus any change in the normal position of the beam is not transmitted. As a result, serious trouble in the form of an accident of the transfer device may follow by interference with the actuating mold of the press.

There may arise another case in which, unless a certain quantity of lubricating oil is distributed to the operating parts, an excessive load is applied to the servo motor eventually resulting, in a short time period, in malfunction. Such a malfuntion cannot be forseen either by just detecting beam position.

SUMMARY OF THE INVENTION

In view of the foregoing disadvantages that following from any control performed merely by positional detection of a transfer device which cannot secure sufficient synchronization between the transfer press and the transfer device as discussed above, an object of the present invention is to provide a novel control system for a transfer device by which the possibility of an unexpected serious accident potentially latent at all times in the conventional control system is avoided.

To accomplish the foregoing object, a malfunction detection system is proposed which monitors the torque of a transfer device comprising a mechanism for controlling the position of a three-dimensionally moving beam by a servo control device independent of a drive mechanism of a transfer press; and in which every torque value of a specific transfer pattern actually measured under normal operation is established to be a reference torque value of the transfer pattern; a torque allowance is calculated by defining upper and lower limit values obtained by adding or subtracting a preliminarily set deviation value to or from the reference torque value, said torque allowance being stored in a control unit; the actual torque value obtained by actual measurement is compared with the stored torque allowance every time when the specific transfer pattern is put into actual operation so that any malfunction is detected instantaneously upon leaving the large allowance.

It is preferable that a function for either raising an emergency alarm or stopping operation upon detecting any malfunction is added to the arrangement.

As mentioned above, the present invention provides a system for three-dimensionally controlling each motion of the transfer device by means of a servo mechanism so as to perform a positional control of perfectly synchronizing operations of respective parts of the transfer press and transfer device and, prevention of serious damage or accident due to unexpected interference of movable members with each other not sufficiently prevented by the positional control alone can be exactly achieved, eventually resulting in the assurance of continuous safe and normal operation of the press as well as accident prevention at all times.

Other objects and advantages of the present invention will become apparent in the course of the following description with reference to the accompanying drawings.

BRIEF DESCRIPTION OF THE DRAWINGS

In the drawings forming a part of the present application.

DESCRIPTION OF THE PREFERRED EMBODIMENT

Figure 1:
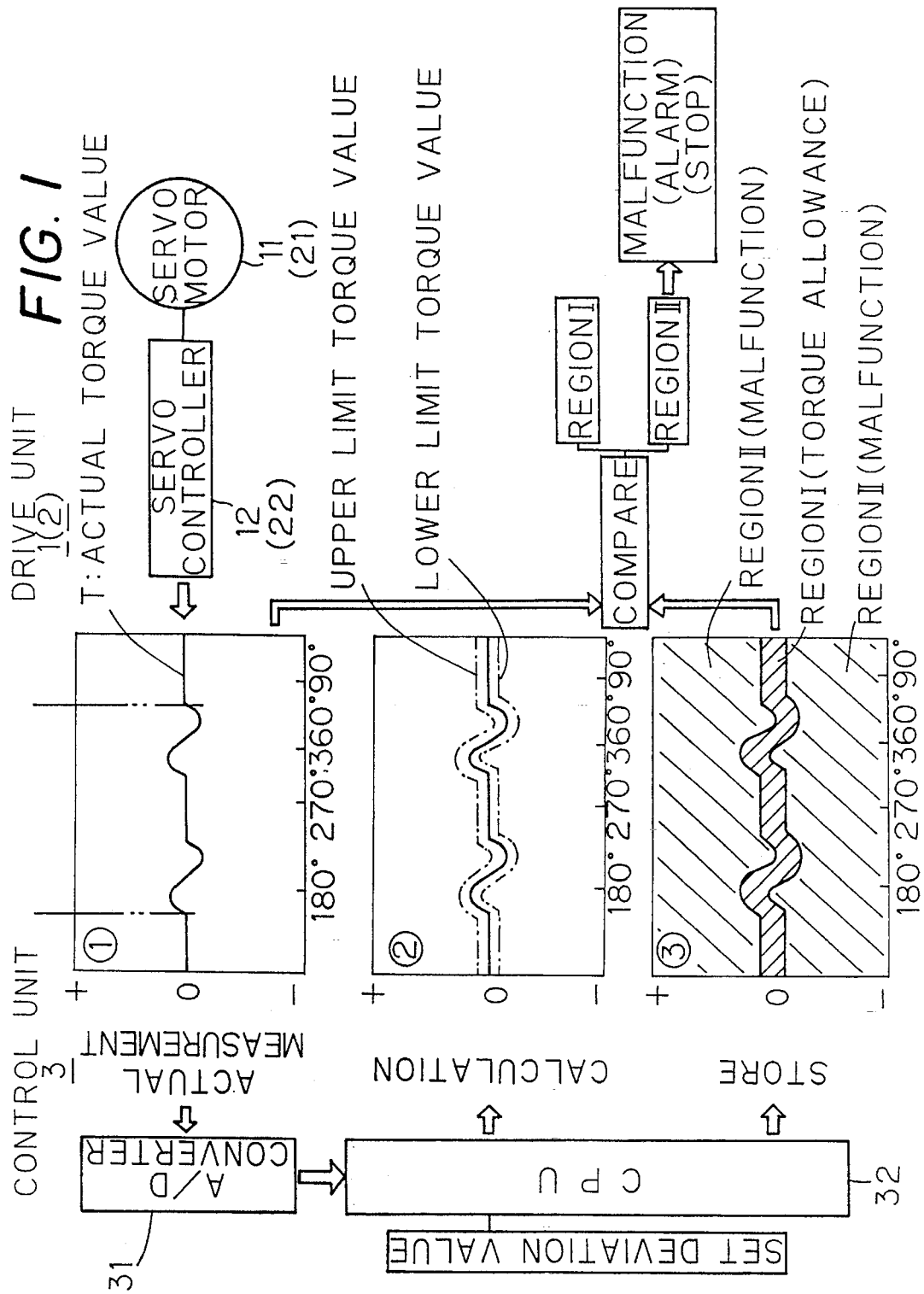
FIG. 1 is a flow chart of information to show the function of the present invention.

FIG. 1 is a flow chart of information showing the function of the present invention. Three-dimensional motion of a beam such as a vertical motion (lift), advance and return motion (feed), and opening-and-closing motion (clamp) are driven by servo motors 11, (21) of independent drive units 1, (2) respectively, the operational for such motions being controlled by a control unit 3 so as to synchronize with the operation of a transfer press. Operation of the servo motor is quantitatively inputted to servo motor controllers 12, (22) in the form of feedback pulses, which are compared with control pulses for controlling the inputted transfer pattern to be adjusted, thus being subject to positional control so as to keep a normal position at all times during operation. It is to be noted that the present invention is characterized in that a further function is added to the above control function, that is, the actual torque value under normal operation of the servo motors is measured and inputted from the servo motor controllers 12, (22) to a CPU 32 of the control unit 3 through an A/D converter 31 and stored in the CPU 32.

Even in the operation of the same transfer press, since forming conditions such as workpiece shape, die or mold shape, arrangement are different for each lot, the motion of the transfer device for supplying plural materials or intermediate forming products to the molds are also different. The torque value to be applied to the servo motors for driving these motions also varies as a matter of course depending upon the transfer distance, the transfer speed (cycle time), the weight of the work, etc. In the present invention, a torque value under normal operation is actually measured. Referring to 1 in FIG. 1, the vertical represents the operation of a transfer press, i.e., the axial angle of the press at the starting and ending points thereof, and the horizontal represents variation with the passage of tie in the torque value to be applied to the servo motors and obtained by actual measurement. Upper and lower limits of predetermined values are added to or subtracted fro the mentioned actual torque value. A certain allowance is established to prevent the frequent operation of an emergency stop or alarm to the extent of affecting workability in case of one point control. For example it may be suitable for practical operation to establish the upper limit torque value to be +10% and the lower limit torque value to be 10%. In this manner, a certain allowance is established and inputted to the control unit 3, and a calculation of addition or subtraction to or from the actual torque value in performed and the resultant value is stored (see 2 in FIG. 1).

The torque allowance, comprising a stored reference torque value obtained by actually measuring a torque value under normal operation and adjusted by either adding to or subtracting from the actual torque value, is hereinafter referred to as region I, and the remaining is referred to as region II, both regions I and II being stored in the control unit 3, whereby for repeating thereafter a forming step of the same pattern as the stored transfer pattern, any malfunction of the transfer device is immediately detected just by designating the pattern and inputting it to the control unit (see 3 in FIG. 1) such that no only synchronization with the press is achieved by positional control but also an instant of generation of abnormal torque is exactly caught.

Figure 2:
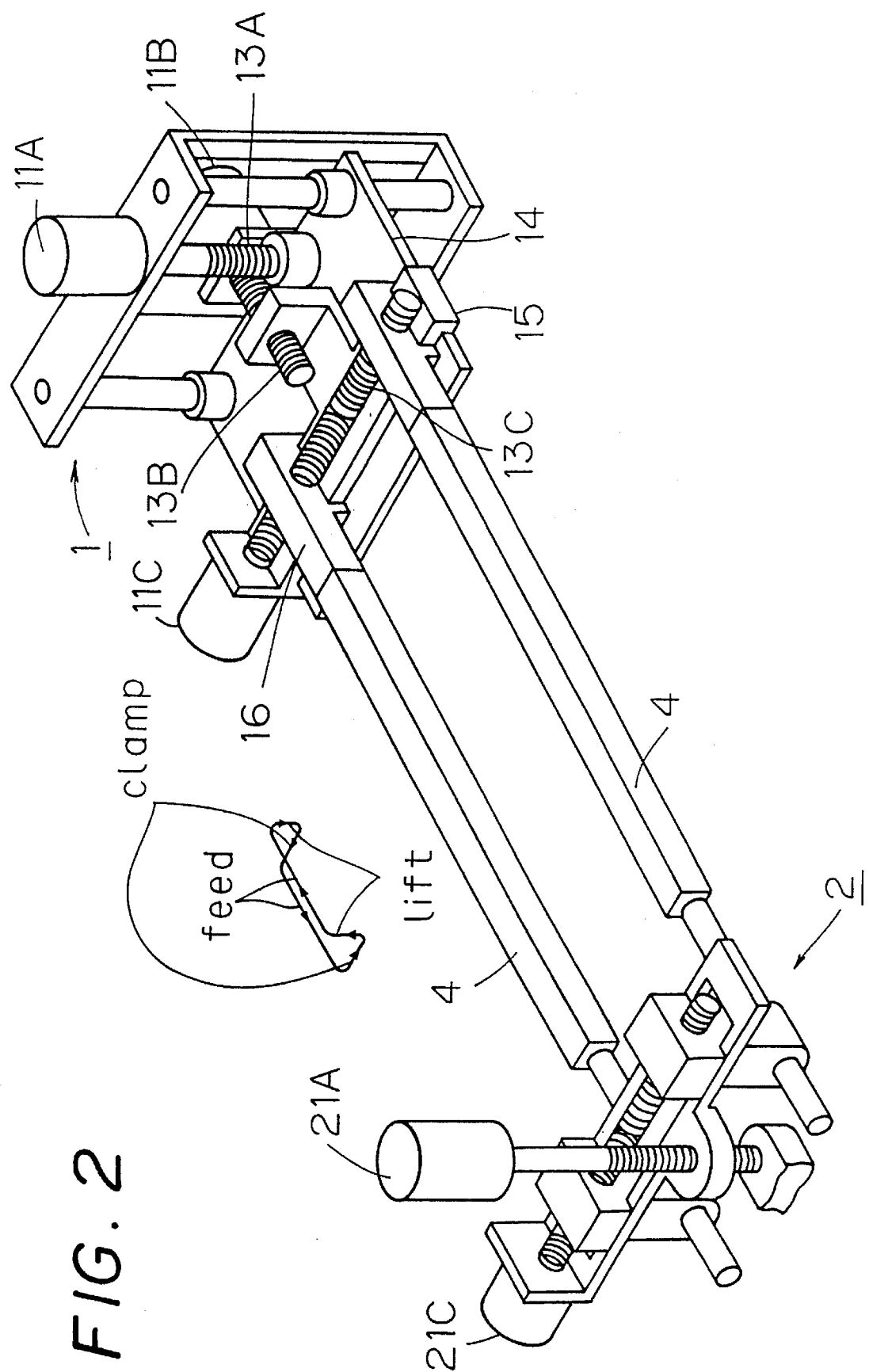
FIG. 2 is a perspective view of an embodiment according to the present invention.

Referring now to FIG. 2, which shows a perspective view of a transfer device being an embodiment according to the present invention, a transfer press and a plurality of workpiece clamping fingers mounted on the inside of beams 4 are not illustrated. The transfer device is provided with drive units 1, 2 respectively on the left and right sides of the press (not illustrated), and the two beams are bridged between the mentioned two drive units. In the drive unit 1, a servo motor 11A for driving the vertical motion causes a screw 13A to turn, thereby moving a vertical transfer carriage 14 mated with the screw 13A. Another servo motor 11B causes a screw 13B to turn, thereby moving a horizontal transfer carriage 15 mated with the screw 13B. A servo motor 11C causes a screw 13C screw-threaded oppositely forming a boundary at the midpoint thereof to turn, thereby opening or closing the beam 4 through a clamp slider 16 mated with the screw 13C. Servo motors 21A, 21C are operated in another drive unit 2, thus five servo motors in total are independently operated in the system to perform forward and backward motion, vertical motion, and open-and-closing motion, whereby a unified transfer operation is achieved.

Figure 3:
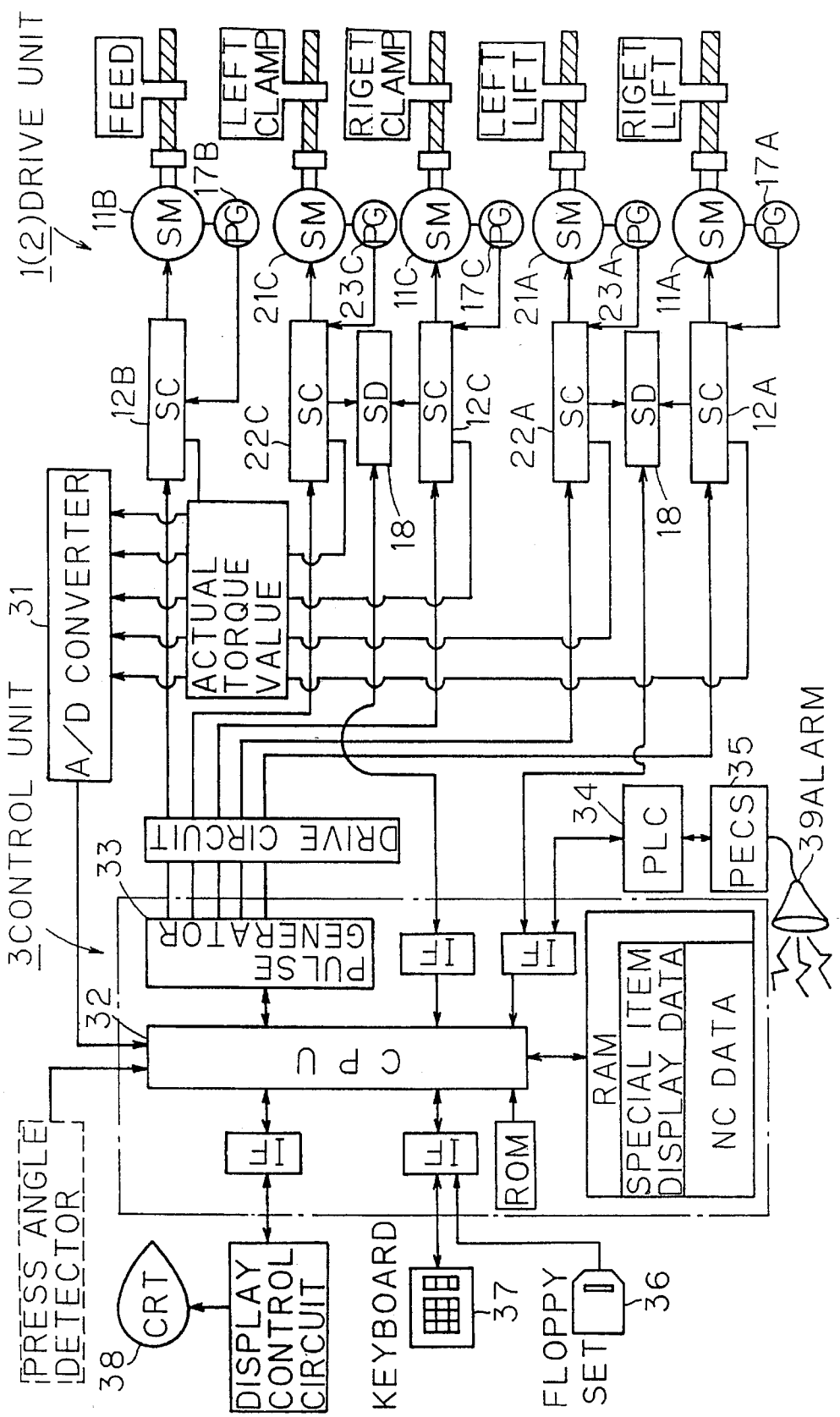
FIG. 3 is a block diagram showing a control mechanism of the embodiment.

FIG. 3 shows a block diagram of the control function achieved according to the present invention. The transfer device of the above construction is provided with five servo motors connected to five screw shafts, and in the turning motion of each servo motor, a pulse signal generated from a pulse generator 33 of the control unit 3 is outputted to the servo controllers 12, 22 through a drive circuit to perform a turning motion as instructed. The actual turning speed of the servo motor is fed back from the pulse detectors (PG) 17, 23 using an encoder for pulse generation to the servo controllers in the form of feedback pulses, and after a comparison an operation instruction is outputted again in the form of pulse signals. As for two servo motors requiring an identical control, a synchronization comparator 18 is disposed between the two servo controllers 12, 22 to detect the difference between the pulse signals, and if any difference is detected, the occurrence of a malfunction is fed back to a sequencer 34 through a CPU 32 to operate a peripheral equipment controller 35, whereby the malfunction is communicate a to an operator.

In the same manner, when any actual torque value outputted from the servo controllers 12, 22 is compared with a torque allowance stored in the CPU 32 and it is found that a value outside of the stored torque allowance, an output signal is sent from the sequencer to the peripheral equipment controller 35, whereby either an alarm is initiated by an alarm 39 or an emergency stop is instantsneously affected.

The control unit 3 is a microcomputer comprising the central processing unit (CPU) 32, ROM, RAM, pulse generator 33 formed by a flip-flop circuit, and necessary interfaces IF. Specific patterns of transfer motion (transfer patterns) are inputted through a floppy disk drive 36 into which a programmed floppy disk is inserted from which initial conditions established by classifying the motions into several standardized patterns are inputted. It is also possible to auxiliarily input specific items not standardized by operating a keyboard. For changing a torque allowance already established from the viewpoint of workability and safety, write operation can be easily performed by the keyboard 37.

Figure 4:
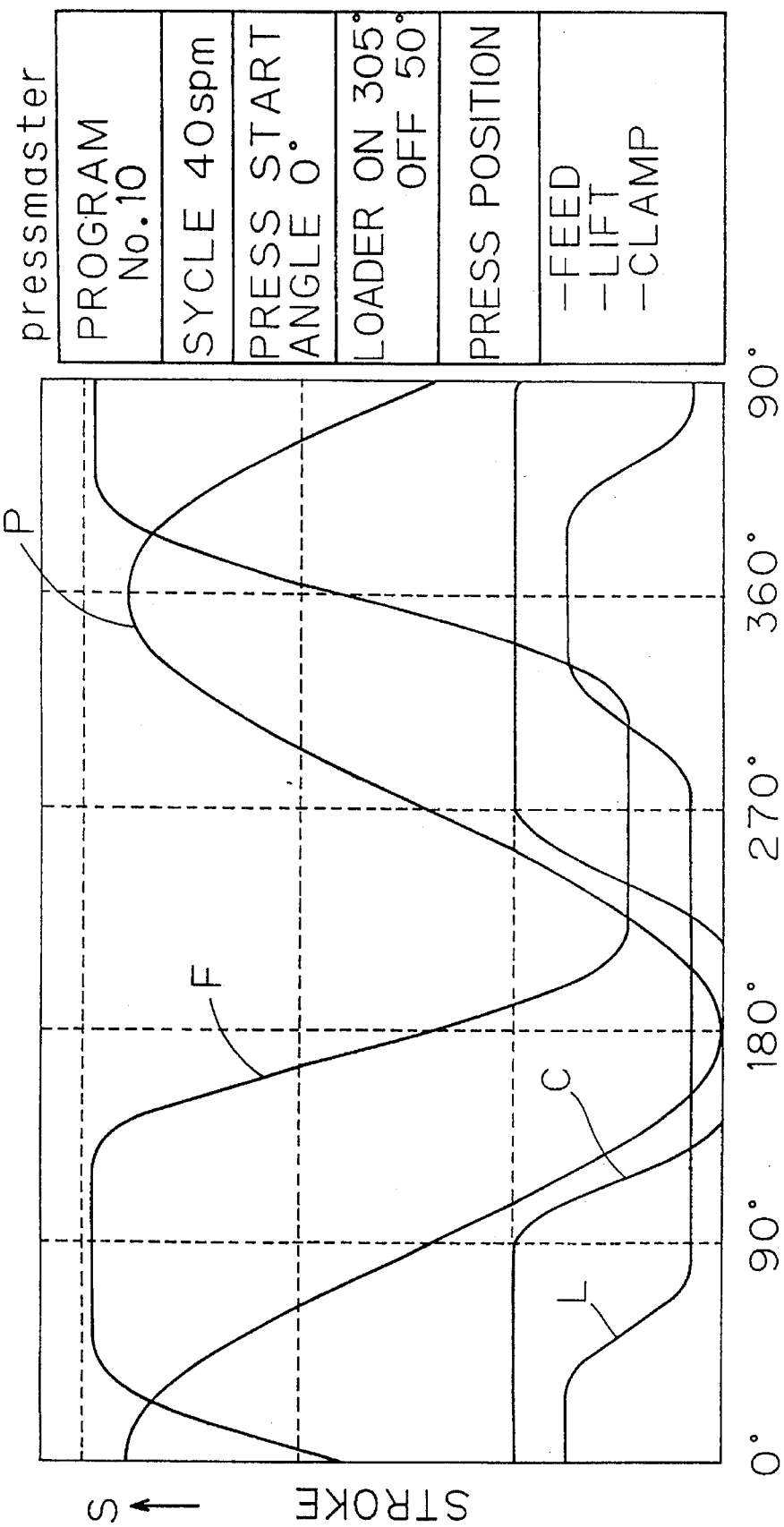
FIG. 4 shows an example of a CRT display.
Figure 5A:
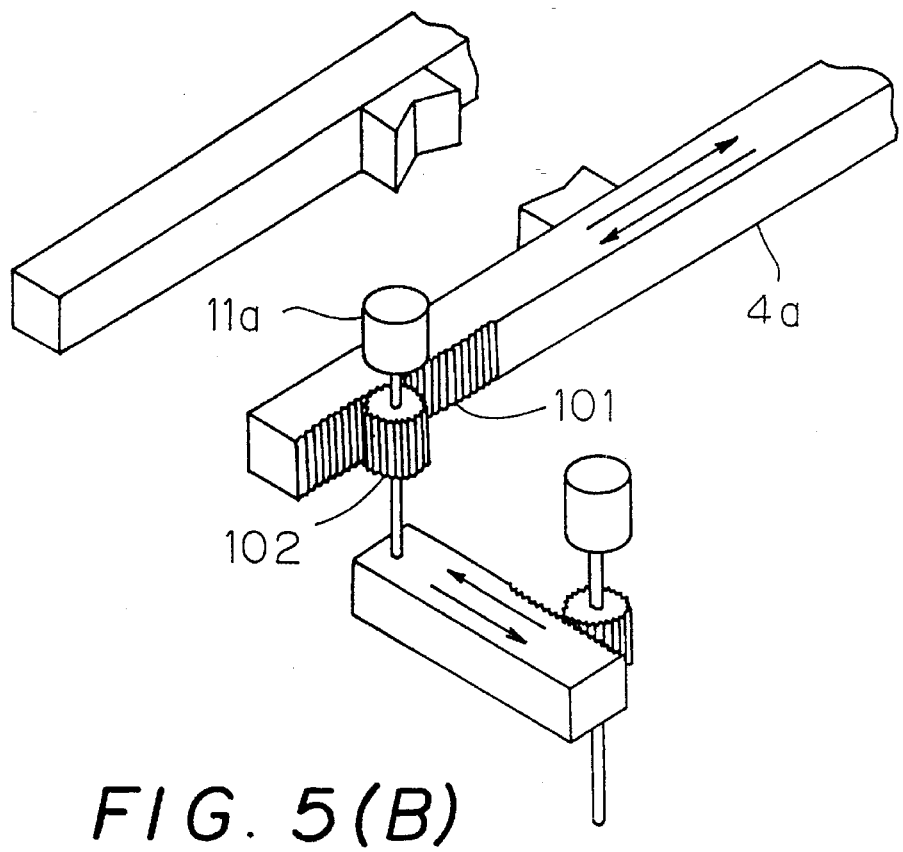
FIG. 5(A) is a perspective view of part of a transfer device according to the prior art.
Figure 5B:
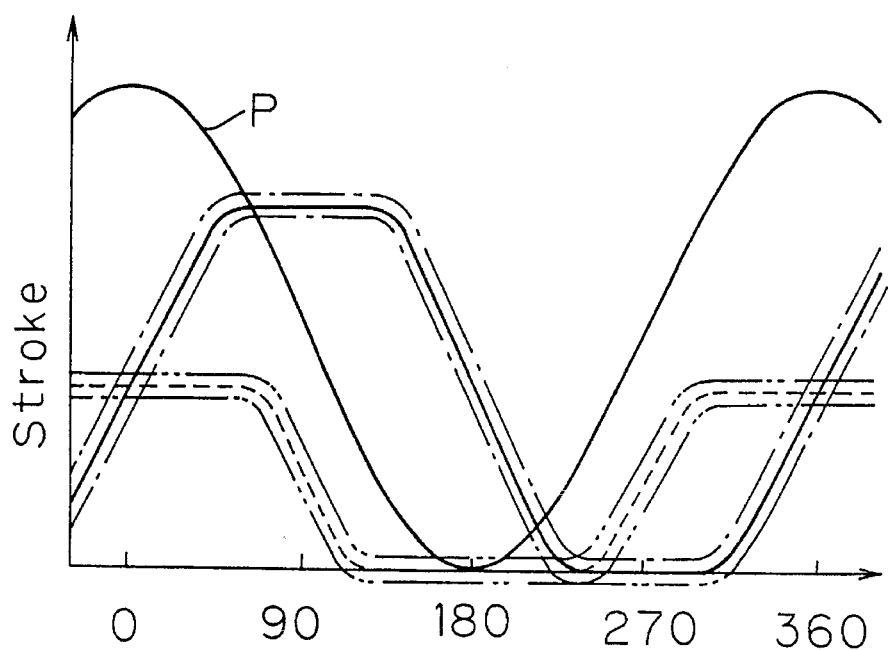
FIG. 5(B) is an example of a CRT according to the prior art.

These inputs are delivered to the CPU 32 through the IF to be processed there and stored in relative regions of the RAM. After image processing in the CPU, data are outputted to a display circuit to be displayed on a display (CRT) 38 in the form of a graphic operation diagram and numeric values. FIG. 4 shows an example of such a display obtained by inputting a desired set value to the CPU 32 by the keyboard 37, and actually the displayed operation diagram (curves) are respectively colored. In FIG. 4, a press operation diagram F indicates a feed operation diagram, L indicates a lift operation diagram, and C indicates a clamp operation diagram.

These operation diagrams may be a kind of simulation by which timing of respective operations are exactly acknowledged. When setting a stroke length and a time (angle) of the starting and ending points, the CPU 32 generates pulse signals according to speed curves for softly starting the three-directional operations except the press operation diagram P and softly stopping the operations. It is a matter of course that the values inputted to the CPU and those fed back after driving respective parts and inputted again are subject to necessary A/D or D/A conversion and sent to the CPU after bivalence thereof.

What is claimed is:

1. A malfunction detecting system for controlling the position of a three-dimensionally moving beam of a transfer press by monitoring the torque of the transfer device, the three-dimensionally moving beam of the transfer press being moved by a servo control device independent of the drive mechanism of the transfer press, comprising: means for establishing a torque value of a specific transfer pattern actually measured under normal operation as a reference torque value of said transfer pattern; means for calculating a torque allowance by defining upper and lower limit torque values obtained by adding or subtracting a preliminarily set deviation value to or from said reference torque value; means for storing the torque allowance in a control unit; and means for comparing an actual torque value with said torque allowance whenever said specific transfer pattern is put into actual operation, so that any malfunction is detected instantaneously upon deviation out of said torque allowance.

2. The malfunction detecting system according to claim 1, wherein an emergency alarm is given upon detecting any said malfunction.

3. The malfunction detecting system according to claim 1, wherein an emergency stop is operation upon detecting any said malfunction.

\* \* \* \* \*